US008483565B2

(12) United States Patent
Elbers et al.

(10) Patent No.: US 8,483,565 B2
(45) Date of Patent: Jul. 9, 2013

(54) PLUGGABLE CONVERSION MODULE FOR A DATA TRANSPORT CARD OF A WAVELENGTH DIVISION MULTIPLEXING SYSTEM

(75) Inventors: Joerg-Peter Elbers, Fuerstenfeldbruck (DE); Klaus Grobe, Utting (DE)

(73) Assignee: ADVA Optical Networking SE, Meiningen (DE)

( * ) Notice: Subject to any disclaimer, the term of this patent is extended or adjusted under 35 U.S.C. 154(b) by 126 days.

(21) Appl. No.: 12/851,946

(22) Filed: Aug. 6, 2010

(65) Prior Publication Data

US 2011/0033188 A1 Feb. 10, 2011

(30) Foreign Application Priority Data

Aug. 6, 2009 (EP) .................................... 09167376

(51) Int. Cl.
*H04J 14/02* (2006.01)
(52) U.S. Cl.
USPC .................. 398/79; 398/81; 398/75; 398/158; 398/159; 398/33; 398/135; 398/136; 398/137; 398/193; 398/194; 398/195; 398/201; 398/196; 398/197; 385/24; 385/37; 385/89; 385/90; 385/92

(58) Field of Classification Search
USPC .................. 398/79, 135, 136, 137, 138, 139, 398/182, 183, 192, 193, 194, 195, 196, 197, 398/198, 199, 200, 201, 115, 75, 81, 158, 398/159, 162, 33, 38, 34; 385/89, 90, 92, 385/93, 24, 37
See application file for complete search history.

(56) References Cited

U.S. PATENT DOCUMENTS

| 7,636,522 | B2 * | 12/2009 | Nagarajan et al. ............... 398/79 |
| 7,725,033 | B2 * | 5/2010 | Nakamoto ....................... 398/95 |
| 7,860,400 | B2 * | 12/2010 | Cole .............................. 398/155 |
| 7,941,053 | B2 * | 5/2011 | Dallesasse .................... 398/139 |
| 8,068,742 | B2 * | 11/2011 | Cole et al. ..................... 398/152 |
| 8,260,150 | B2 * | 9/2012 | Mahgerefteh et al. ......... 398/193 |
| 2005/0084269 | A1 * | 4/2005 | Dallesasse et al. ............ 398/135 |
| 2005/0286909 | A1 * | 12/2005 | Kish et al. ...................... 398/196 |
| 2008/0107422 | A1 * | 5/2008 | Cole .............................. 398/135 |
| 2008/0292322 | A1 | 11/2008 | Daghighian et al. |

OTHER PUBLICATIONS

Bohn et al., "Adaptive Distortion Comprehension with Integrated Optical Finite Impulse Response Filters in High Bitrate Optical Communication Systems." *IEEE Journal of Selected Topics in Quantum Electronics* 10.2 (2004): 273-280.
Cole et al., "100 GBE—Optical LAN Technologies," *IEEE Applications and Practice*. Dec. 2007. IEE Applications and Practice (2007): 12-19.
Duelk et al.,"100 Gigabit Ethernet—Applications, Features, and Challenges." *INFOCOM 2006. 25th IEEE International Conference on Computer Communications* (2006):1-5.
European Search Report and Written Opinion for EP 09167376.4 dated Dec. 22, 2009.

* cited by examiner

*Primary Examiner* — Hanh Phan
(74) *Attorney, Agent, or Firm* — Jenkins, Wilson, Taylor & Hunt, P.A.

(57) ABSTRACT

A data transport card comprising an interface to receive high speed data streams from at least one client, and a pluggable conversion module which converts said data streams into optical data signals and couples these optical data signals into at least one wavelength division multiplexing channel for transport of said optical data signals via an optical fiber.

21 Claims, 15 Drawing Sheets

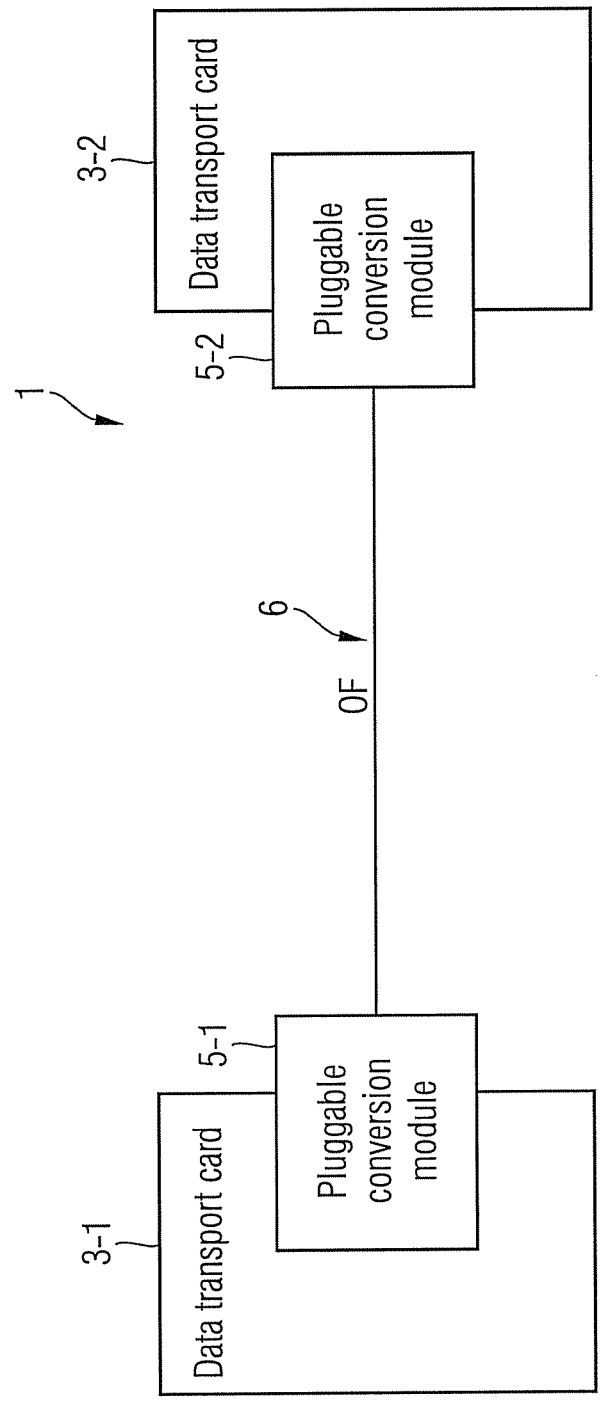

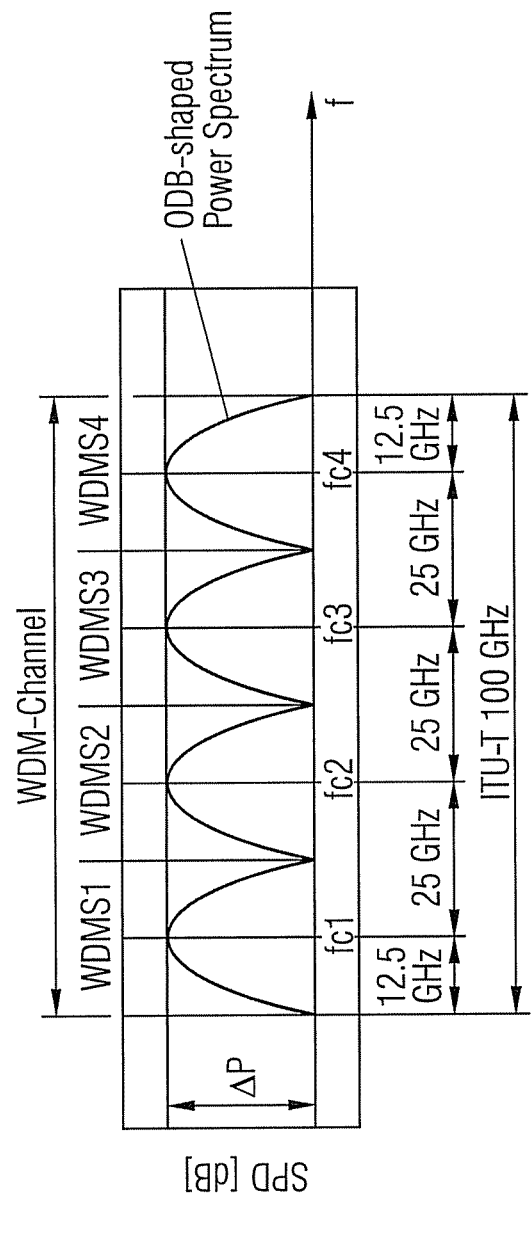
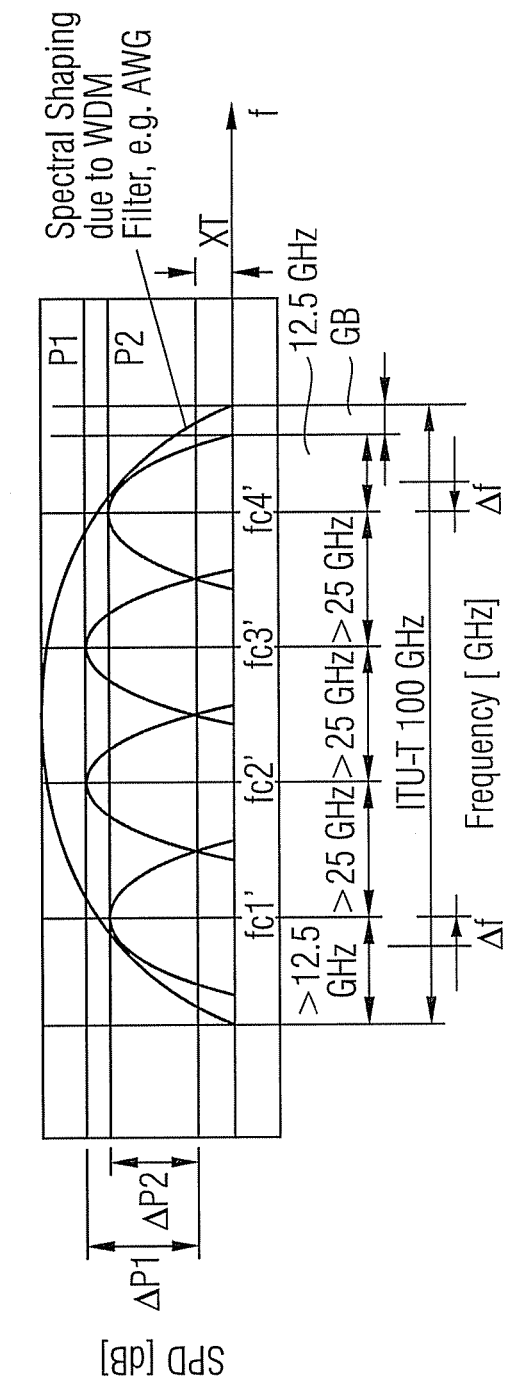
Fig. 4A
Fig. 4B

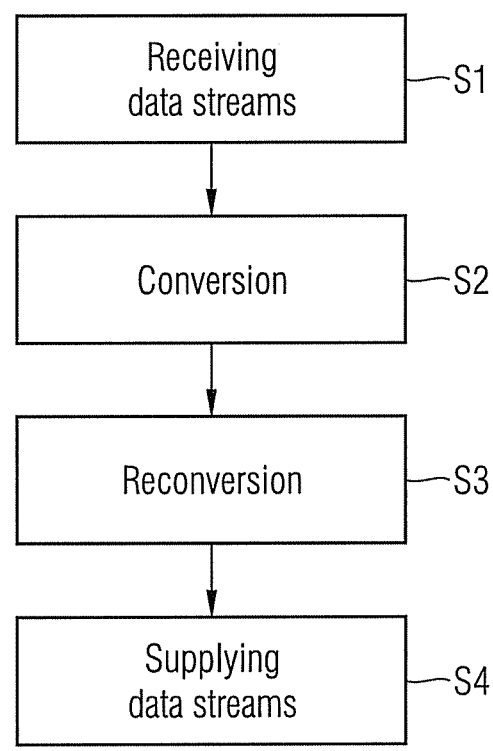

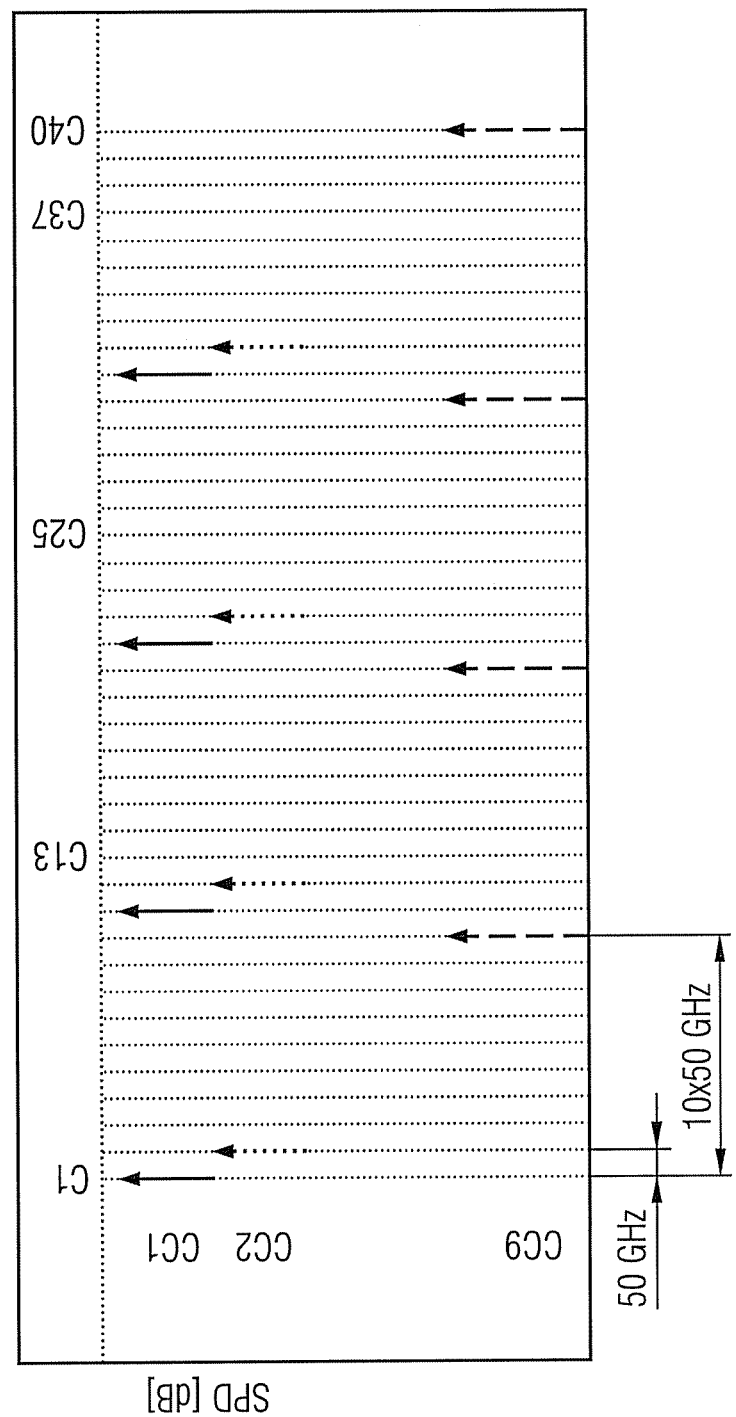

PLUGGABLE CONVERSION MODULE FOR A DATA TRANSPORT CARD OF A WAVELENGTH DIVISION MULTIPLEXING SYSTEM

CROSS-REFERENCE TO RELATED APPLICATIONS

This application claims the benefit of European Patent Application No. 09167376.4, filed on Aug. 6, 2009, the disclosure of which is incorporated herein in its entirety by reference.

TECHNICAL BACKGROUND

The invention relates to a pluggable module for a data transport card of a wavelength division multiplexing system and a corresponding method for transporting data via an optical fibre.

In a wavelength division multiplexing (WDM) system multiple optical carrier signals are multiplexed on a single optical fibre by using different wavelengths or colors of laser light to carry different optical signals. The wavelength division multiplexing technology uses efficiently the capacity of an optical fibre and enables a bidirectional communication over one optical fibre. The wavelength division multiplex (WDM) systems allow to expand the capacity of the network without laying additional fibres. WDM systems can operate on single mode fibre optical cables.

Wavelength division multiplexing (WDM) systems can comprise coarse and dense wavelength division multiplexing (WDM) systems. Optical fibres can be used to transmit optical data signals to transport information data from at least one source client to at least one target client. Each client can provide one or several high speed data streams of different formats such as Ethernet data streams, InfiniBand data streams or Fibre Channel data streams.

Accordingly, there is a need to provide a pluggable module for a data transport card of a wavelength division multiplexing system allowing the flexible connection between clients generating or evaluating high speed data streams.

SUMMARY OF THE INVENTION

The invention provides a pluggable conversion module for a data transport card, wherein said pluggable conversion module comprises means for converting input data streams into optical data signals and for coupling these optical data signals into WDM subchannels of at least one wavelength division multiplexing (WDM) channel for transport of optical data signals via an optical fibre and means for converting optical data signals received via the optical fibre in different wavelength division multiplexing (WDM) subchannels of at least one wavelength division multiplexing (WDM) channel into output data streams.

The pluggable conversion module according to the present invention as employed by a WDM system is highly flexible and allows different configurations for different applications or network environments.

A further advantage of the pluggable conversion module according to the present invention is that it can be implemented with comparatively low costs and complexity.

A further advantage of the pluggable conversion module according to the present invention is that it can be easily miniaturized and needs only few space when integrated in a chip.

The pluggable conversion module according to the present invention works bidirectionally and can be used on the transmission side and on the reception side of a WDM data transport system.

In a possible embodiment, the pluggable conversion module according to the present invention is integrated in an active optical fibre having two pluggable bidirectional conversion modules on each end of the optical fibre.

In a possible embodiment, the pluggable conversion module according to the present invention can be plugged in into a socket of a data transport card of a wavelength division multiplexing system.

The invention further provides a data transport card comprising an interface to receive high speed data streams from at least one client; and a pluggable conversion module which converts said data streams into optical data signals and couples these optical data signals into at least one wavelength division multiplexing (WDM) channel for transport of said optical data signals via an optical fibre.

This data transport card can be inserted into a slot or receiving means of a client such as a router.

The invention further provides a data transport card for the receiving or far end side comprising a pluggable conversion module which converts optical data signals received via an optical fibre in different wavelength division multiplexing (WDM) subchannels to at least one wavelength (WDM) channel having a predetermined bandwidth to data streams for at least one client.

The receive end data transport card can comprise a socket or reception means for plug-in of the pluggable conversion module according to the present invention.

In a possible embodiment of a WDM data transport system according to the present invention there is provided at least one data transport card on the transmitting side having an interface to receive high speed data streams from at least one client and a pluggable conversion module which converts the data streams into optical data signals and couples these optical data signals into at least one wavelength division multiplexing (WDM) channel for transport of said optical data signals via an optical fibre,
wherein said WDM data transport system further comprises at least one data transport card at the far end or receiving side comprising a further pluggable conversion module which converts optical data signals received via the optical fibre in different wavelength division multiplexing (WDM) subchannels to at least one wavelength division multiplexing (WDM) channel having a predetermined bandwidth into data streams for at least one receiving client.

In one embodiment there is provided a pluggable conversion module which performs both, conversion of data streams into optical data signals and reconversion of optical data signals into data streams.

In an alternative embodiment, there is provided a pluggable conversion module which performs a conversion of data streams into optical data signals and another pluggable module which performs the reconversion of optical data signals into data streams.

In a possible embodiment of the WDM data system, the wavelength division multiplexing (WDM) channel has a predetermined bandwidth and comprises a number of WDM subchannels, wherein the number of WDM subchannels corresponds to the number of received high speed data streams from one or several clients.

In a possible embodiment, each wavelength division multiplexing (WDM) channel has a bandwidth of 100 GHz.

In a possible embodiment, each wavelength division multiplexing (WDM) channel comprises four 25 WDM subchannels.

In an alternative embodiment, each wavelength division multiplexing (WDM) channel comprises two 50 GHz WDM subchannels.

In an alternative embodiment, the wavelength division multiplexing (WDM) channel has a bandwidth of 50 GHz and has either two 25 GHz WDM subchannels or one 50 GHz WDM subchannel, i.e. in this embodiment the WDM channel is identical to the WDM subchannel.

In a possible embodiment, the data transport card receives via its interface N high speed data streams such as four 25 Gbit/s data streams from one 100 GbE client, 10×10 Gbit/s data streams from a 100 GbE client, four or more 16 Gbit/s or 20 Gbit/s data streams from different clients, ten 10 Gbit/s data streams from different clients or twelve 8 Gbit/s data streams from twelve different clients etc. The number N of high speed data streams is not limited and can be N=2, 4, 8, 12, etc.

The data streams can vary in their data format. In a possible embodiment, the data streams are Ethernet data streams. In an alternative embodiment, said data streams are Fibre Channel data streams. In another embodiment, the data streams are formed by InfiniBand data streams.

In an embodiment of the WDM system and the data transport card according to the present invention, the pluggable conversion module comprises a laser array for converting the data streams into optical data signals.

In a possible embodiment, said laser array is formed by a directly modulated laser array (DML-laser array).

In a possible embodiment, the DML laser array comprises a CML (Chirp-Managed Laser)-array.

In an alternative embodiment, the laser array is formed by an externally modulated laser array (EML laser array).

In a preferred embodiment of the WDM data transport system and the data transport card as well as the pluggable conversion module, the pluggable conversion module comprises at least one tuneable optical signal reshaper (TOSR) being adaptable to the bandwidth and to the spacing of the WDM subchannels to optimize WDM subchannel power levels and to minimize crosstalk.

In a possible embodiment, the laser array of the pluggable conversion module is tuneable by a feedback control signal provided by a receive end transport card located on the receiving side.

In a possible embodiment, an inband or outband embedded communication channel ECC is provided for supplying the feedback control signals sent by the receive end data transport card back to said data transport card on the transmitting side via said optical fibre.

In a possible embodiment of the data transport card according to the present invention, the WDM subchannel center frequencies are set by the tuneable laser array in response to the feedback control signal to minimize the bit error rate (BER) of the transported optical data signals.

In a possible embodiment, the lasers can be tuned over several WDM subchannels, e.g. over eight or nine WDM subchannels each having a bandwidth of 50 GHz. The respective lasers can be tuned for instance thermally.

In a possible embodiment of the data transport card according to the present invention, the pluggable conversion module comprises a wavelength locker which locks the WDM subchannel center frequencies.

In a possible embodiment of the pluggable module and the data transport card according to the present invention, the tuneable optical signal reshaper (TOSR) is provided for spectrum shaping of the WDM subchannels, wherein WDM subchannel bandwidth and spacing of the WDM subchannel center frequencies are adjusted to minimize the bit error rate (BER) of said transported optical data signals.

In a possible embodiment of the pluggable module and the data transport card according to the present invention, the tuneable optical signal reshaper (TOSR) is tuneable in response to the feedback control signal from the receive and data transport card sent via the inband or outband communication channel ECC.

In a possible embodiment of the pluggable module and the data transport card according to the present invention, the optical data signals comprise an optical duo-binary (ODB) modulation format.

In another embodiment of the pluggable module and data transport card according to the present invention, the optical data signals comprise an amplitude modulation format.

In a further alternative embodiment of the pluggable module and the data transport card according to the present invention, the optical data signals comprise a phase modulation format.

In a possible embodiment of the data transport card according to the present invention, the data transport card comprises one or several electronic modules,
wherein said electronic module comprises
a mapping and framing unit which maps the data streams into ODU data format frames,
a monitoring unit which monitors data integrity,
a FEC unit which performs a forward error correction of said ODU data frames, and
a deskewing unit for performing a deskewing of the data streams.

In a possible embodiment, the FEC unit can be switched on or off by a activation/deactivation control signal.

In a possible embodiment, the deskewing unit can be switched on or off by an activating or deactivating control signal.

In a possible embodiment, the high speed data streams provided by the at least one client comprise high speed Ethernet data streams, high speed Fibre Channel data streams and high speed InfiniBand data streams, each having a bit rate of more than 4 GBit/sec.

In a possible embodiment of the data transport card according to the present invention, the one or several electronic modules are formed by FPGA units.

In a possible embodiment of the data transport card according to the present invention, the data transport card comprises a booster amplifier which is provided for amplitude amplification of the optical data signals.

Depending on the amplification factor of the booster amplifier, the maximum distance for transmitting the optical data signals via the optical fibre can be adjusted.

In a possible embodiment, the data transport WDM system according to the present invention can be used for transmitting signals over a long distance of several hundred kilometers.

In a possible embodiment, amplification of the booster amplifier can be adjusted in response to a booster amplification control signal.

The invention further provides a receive end data transport card having a pluggable conversion module which converts the optical data signals received via an optical fibre in different wavelength multiplexing (WDM) subchannels of at least one wavelength division multiplexing (WDM) channel having a predetermined bandwidth into data streams for at least one client.

In a possible embodiment, the pluggable conversion module of the receive end data transport card comprises
a tuneable subchannel WDM for each WDM channel for decoupling said WDM subchannels and
a photodiode array for converting the decoupled WDM subchannels into the data streams.

In a possible embodiment, the pluggable conversion module on the receive end side is plugged into a socket of a receive end data transport card which comprises a preamplifier amplifying the optical data signals received via the optical fibre for applying them to the pluggable conversion module.

In a possible embodiment, the pluggable conversion module on the receive end side comprises a tuneable WDM filter.

In a possible embodiment, the receive end data transport card comprises also an electronic module including a mapping and framing unit, a monitoring unit, a FEC unit and a deskewing unit.

The invention further provides a method for transporting data comprising the steps of:
receiving data streams from at least one client,
converting said data streams into optical data signals and coupling these optical data signals into WDM subchannels of at least one WDM channel for transport of said optical data signals via an optical fibre,
reconverting the optical data signals received via said optical fibre in different WDM subchannels of said WDM channel into data streams, and supplying the reconverted data streams to at least one client.

The invention further provides a computer program comprising executable instructions for performing a method for transporting data, said method comprising the steps of:
receiving data streams form at least one client,
converting the data streams into optical data signals and coupling these optical data signals into WDM subchannels of at least one WDM channel for transport of said optical data signals via an optical fibre,
reconverting the optical data signals received via said optical fibre in different WDM subchannels of said WDM channel into data streams, and supplying said reconverted data streams to at least one client.

The invention further provides a data carrier computer program product which stores such a computer program.

BRIEF DESCRIPTION OF THE FIGURES

In the following, embodiments of the pluggable conversion module, a data transport card, an active optical fibre and a WDM data system as well as of a method for transporting data according to the present invention are described with reference to the enclosed figures.

FIG. 3 shows a diagram for illustrating a possible embodiment of an active optical fibre as employed by the WDM system according to the present invention;

FIGS. 4A, 4B show a spectrum for illustrating a possible embodiment of a WDM system according to the present invention;

FIG. 12 shows a flowchart of a possible embodiment of a data transport method according to the present invention;

FIGS. 14A, 14B show spectra for illustrating further possible embodiments of a WDM system according to the present invention.

DETAILED DESCRIPTION OF EMBODIMENTS

Figure 1:
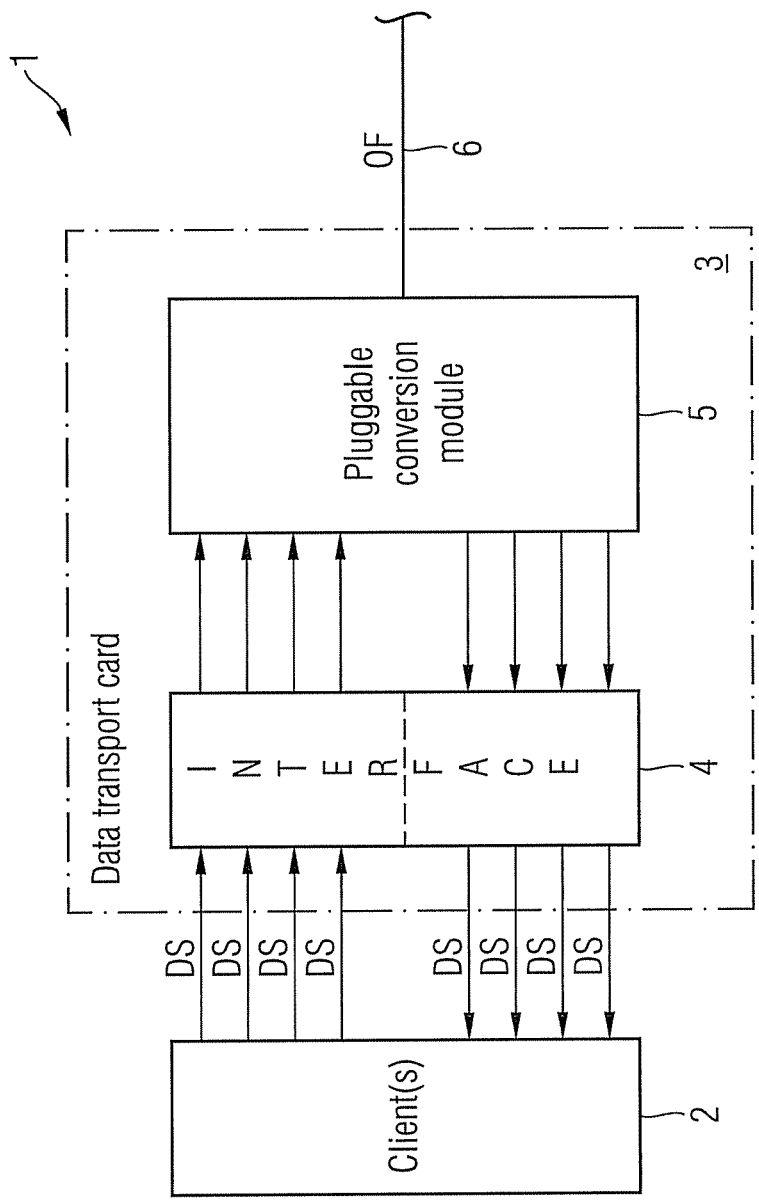
FIG. 1 shows a block diagram of a possible embodiment of the data transport card as employed by the WDM system according to the present invention.

As can be seen from FIG. 1, a wavelength division multiplexing (WDM) data transport system 1 according to the present invention can comprise several clients 2 each having at least one data transport card 3. A client 2 can be any kind of data processing unit such as a host computer, a router or any kind of data source or sink generating high speed data streams or processing high speed data streams. The data transport card 3 as shown in FIG. 1 can be inserted in a possible embodiment into a card slot of the respective client 2. In alternative embodiments, the data transport card 3 receives data streams from different clients via data ports and can be integrated in a separate device.

As shown in FIG. 1, the data transport card 3 according to the present invention comprises an interface 4 to receive high speed data streams DS from one or several clients 2. The data streams DS are high speed data streams having a bit rate of more than 4 GBit/sec. The data format of the data streams DS can vary. In a possible embodiment, the data streams DS comprise Ethernet data streams, Fibre Channel data streams or InfiniBand data streams. The data streams DS as shown in FIG. 1 can be received by the interface 4 from the same or different client 2. In an exemplary embodiment, the client 2 is a 100 GBE Ethernet client for providing four data streams DS each having a bit rate of 25 GBit/sec. In the embodiment shown in FIG. 1, the interface 4 is a bidirectional interface and can supply data streams to the client 2 as well. The data transport card 3 can comprise a socket or receiving means for the plug-in of a pluggable conversion module 5 according to the present invention. In a possible embodiment, the pluggable conversion module 5 is integrated into a housing or chip. The pluggable conversion module 5 of the data transport card 3 converts the data streams DS into optical data signals and couples these optical data signals into at least one wavelength division multiplexing (WDM) channel for transport of the optical data signals via an optical fibre 6 as shown in FIG. 1.

In a possible embodiment, the pluggable conversion module 5 works bidirectionally and also converts optical data signals received via the optical fibre 6 in different wavelength division multiplexing (WDM) subchannels of at least one wavelength division multiplexing (WDM) channel into data streams for the at least one client 2. Accordingly, the pluggable conversion module 5 in the embodiment of FIG. 1 can be a bidirectional pluggable conversion module performing a conversion between optical data signals and data streams in both directions. In an alternative embodiment, the data transport card 3 comprises two separate pluggable conversion modules 5-1, 5-2 wherein the first pluggable conversion module 5-1 is provided for performing the conversion of the data streams into optical data signals and the other pluggable conversion module 5-2 is provided for performing the conversion of optical data signals into data streams.

The optical fibre 6 has a broad bandwidth for transporting data. In a possible embodiment, 40 to 80 100 GHz WDM channels can be provided by one optical fibre 6. In an alternative embodiment, the optical fibre 6 provides bandwidth for 80 to 160 50 GHz WDM channels. In the WDM data transport system 1 according to the present invention, each WDM channel can comprise one or several WDM subchannels. In a possible embodiment, each WDM channel has a bandwidth of 100 GHz and comprises four 25 GHz WDM subchannels. In an alternative embodiment, each WDM channel has a bandwidth of 100 GHz and comprises two 50 GHz WDM subchannels.

The wavelength division multiplexing WDM channel as employed by the WDM data transport system 1 according to the present invention has a predetermined bandwidth and comprises of WDM subchannels corresponding in a preferred embodiment to a number N of data streams DS.

Figure 2:
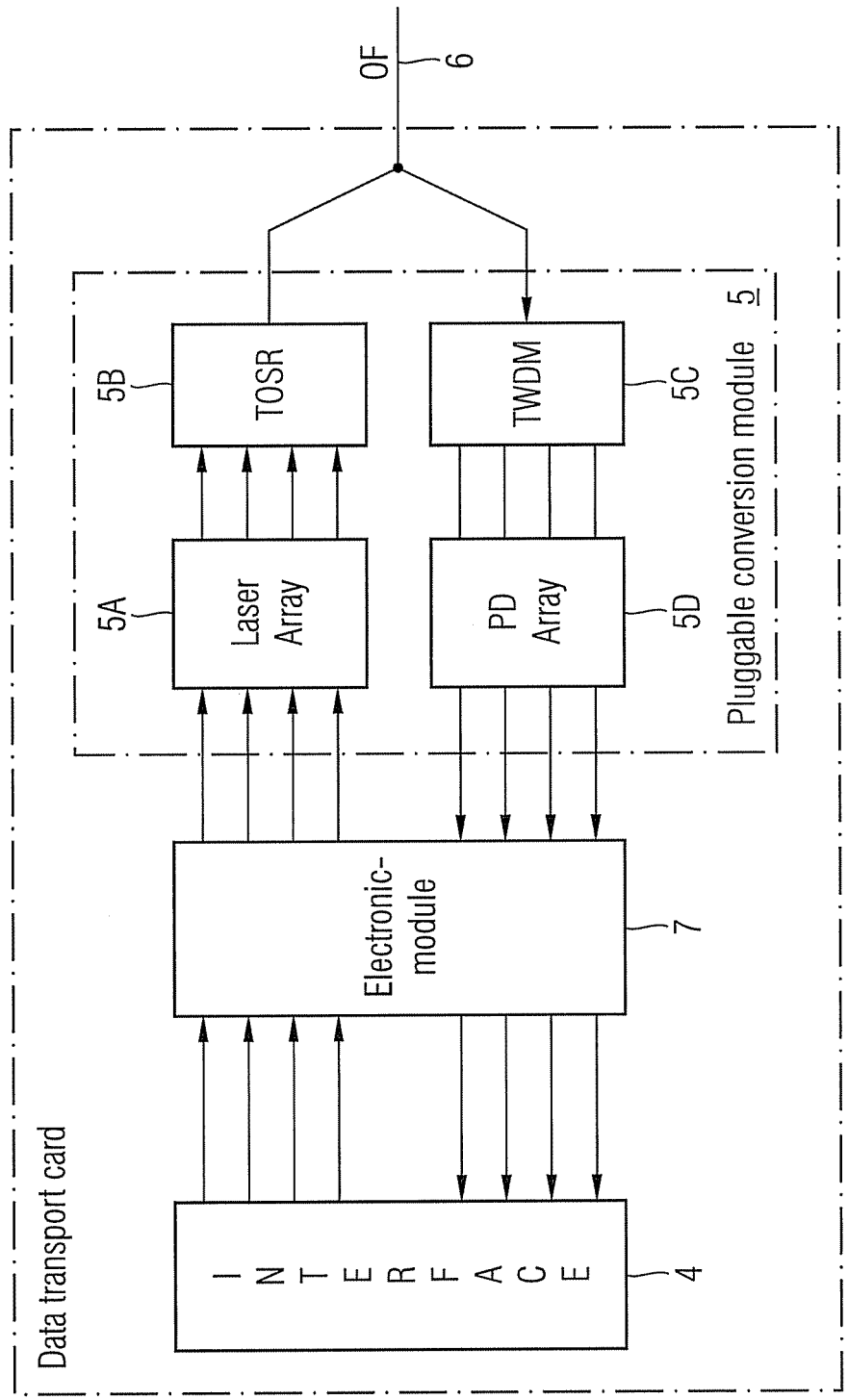
FIG. 2 shows a block diagram of a possible embodiment of a pluggable conversion module plugged into a data transport card as employed by a WDM system according to the present invention.

As can be seen from FIG. 2, the data transport card 3 according to the present invention comprises in the embodiment of FIG. 2 an electronic module 7 which is provided between the bidirectional data stream interface 4 and the pluggable conversion module 5. The electronic module 7 performs different functions such as deskewing, framing, monitoring, error correction of the data streams DS received from the interface 4 and supplied to the interface 4. The electronic module 7 can comprise different subunits such as a mapping and framing unit which maps the data streams as into ODU data frames, a monitoring unit which monitors a data integrity, a FEC unit which performs a forward error correction of the ODU data frames and a deskewing unit which performs a deskewing of the data streams DS. In a possible embodiment, the electronic module 7 is implemented by an FPGA unit.

In a possible embodiment, the electronic module 7 performs an additional function such as bit rate adaption or stuffing of signals. In a possible embodiment, the electronic module 7 further performs a clock adaption and multiplexing/demultiplexing functions. The provision of the electronic module 7 is optional. The electronic module 7 performs deskewing, framing and FEC. For other multiple high speed data signals, the electronic module 7 can comprise a retiming function. Further, it can perform a clock adaption and framing as well as forward error correction coding FEC.

In a possible embodiment, the forward error correction unit can be switched on or off in response to a control signal. In a further embodiment, also the deskewing unit within the electronic module 7 can be activated or deactivated by means of a control signal. Accordingly, it is possible to provide a low signal latency.

As can be seen in the embodiment of FIG. 2, the pluggable conversion module 5 comprises in the transmitting signal path a laser array 5A for converting the data streams DS processed by the electronic module 7 into optical data signals. The laser array 5A is in a possible embodiment a directly modulated laser array (DML laser array). In a possible embodiment, the directly modulated laser array is a CML laser array. In an alternative embodiment, the laser array 5A can be formed by an externally modulated (EML) laser array. In a possible embodiment, the laser array 5A is tuneable. The laser array 5A can be tuneable in response to a feedback control signal received by the pluggable conversion module 5 as shown in FIG. 2 from a receive end data transport card at the far end side via an inband or outband embedded communication channel ECC. The inband or outband embedded communication channel ECC is provided for transporting said feedback control signal sent by said receive end transport card back to said data transport card 3 via the optical fibre 6.

The pluggable conversion module 5 comprises further in the transmitting signal path a tuneable optical signal reshaper TOSR 5B being adaptable to the bandwidth and to the frequency spacing of the WDM subchannels to optimize WDM subchannel power levels P and to minimize crosstalk. The tuneable optical signal reshaper TOSR 5B is provided for spectrum shaping of the WDM subchannels wherein the WDM subchannel bandwidth and the frequency spacing of the subchannel center frequencies are adjusted to minimize a bit error rate (BER) of the optical data signals transported via the optical fibre 6. In a possible embodiment, the tuneable optical signal reshaper TOSR 5B is also tuneable in response to a feedback control signal from the receive end data transport card sent via the inband or outband communication channel ECC. In a possible embodiment, the tuneable optical signal reshaper TOSR 5B can be formed by a filter. The tuneable or adaptable optical signal reshaper TOSR 5B is tuneable with respect to both, channel bandwidth of the WDM subchannels and their periodicity or grid spacing.

Figure 14A:
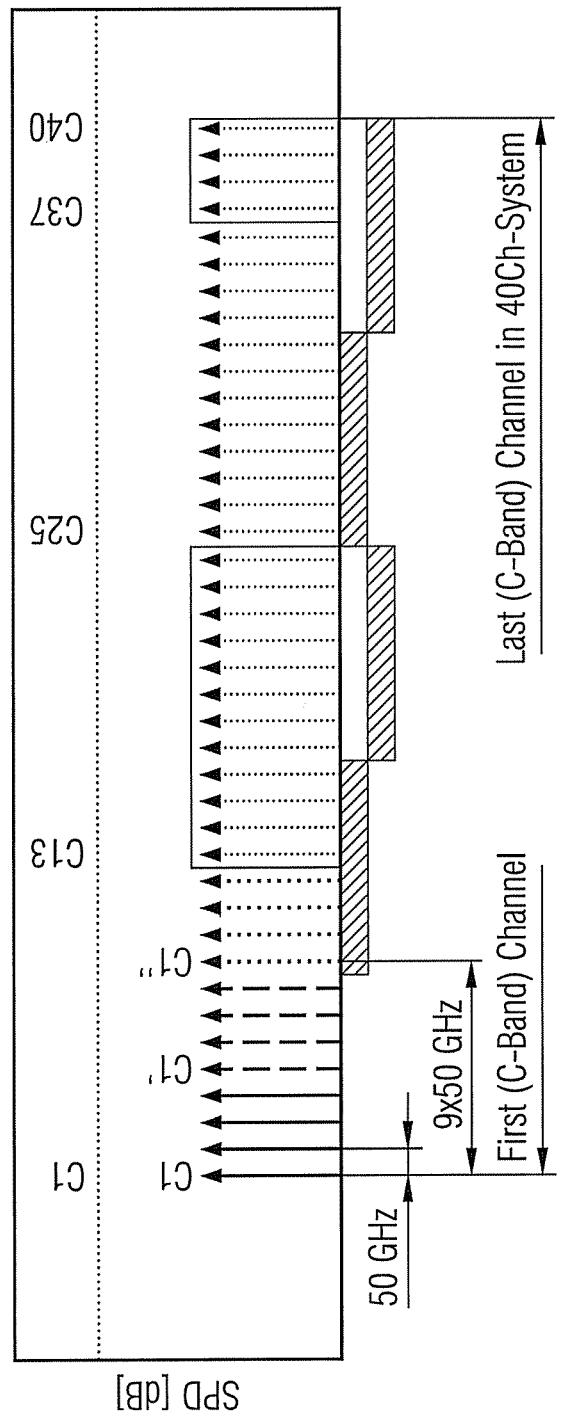

In a possible embodiment, the pluggable conversion module 5 is adapted to be tuneable to a wider extent to reduce the number of module variants or spare parts. For this general tuneability of the pluggable conversion module 5 the laser light signals can be tuned, e.g. thermally, over a range of several WDM subchannels, for example over a range of eight WDM subchannels each having a bandwidth of 50 GHz. The tuneability can range over an adaptable number of WDM subchannels, for example to an increased tuning range of nine to ten 50 GHz WDM subchannels. FIG. 14A shows a spectrum of an embodiment with a tuning range of e.g. nine WDM subchannels. In a possible embodiment, a thermal tuning is performed. With a 9×50 GHz tuning and adjacent subchannels only four pluggable module variants or spare parts are necessary. In a possible embodiment, a 50 GHz subchannel frequency spacing on the pluggable module is provided. In an alternative embodiment, a 25 GHz subchannel frequency spacing is provided.

In an embodiment providing the tuning range of 8×50 GHz, five pluggable module variants or spare parts with adjacent subchannels are necessary. Upgrades on existing channel grids or frequency spacings having predetermined waveband slots is possible.

FIG. 14B illustrates a further possible embodiment wherein the WDM subchannels comprise a skip-seven frequency spacing. In this embodiment 32 channels can be covered with a single module. With an embodiment employing a skip-nine frequency spacing 40 WDM subchannels can be covered with a single conversion module. This allows to use only one or two variants or different spare parts for a 40 channel WDM system. Accordingly, the number of spare parts is significantly reduced in this embodiment. In a possible embodiment, the pluggable module can be thermally tuned up to 10×50 GHz. In this case for a skip zero, i.e. all WDM subchannels lay directly beside each other, only four variants are needed. In particular, in greenfield deployment in which a skip-9 variant can be used an improvement can be achieved because only a single variant of spare part is necessary. By adapting or adjusting the WDM subchannel spacing, the number of necessary spare parts can be optimized. For example, a skip zero plus skip nine with a maximal tuning capacity of 10×50 GHz can be provided in one embodiment. With this embodiment using skips zero plus skip seven/eight/nine the number of spare parts and/or production variants can be minimized. Five (skip 0 tuned 8×50 GHz upgrade) plus two (skip 7 tuned 8×50 GHz, greenfield) gives a total of seven production variants. In an alternative embodiment four (skip 0 tuned 9×50 GHz, upgrade) plus two (skip 8 tuned 9×50 GHz, Greenfield) lead to a maximum of only five production variants. In a further embodiment four (skip 0 tuned 10×5 GHz, upgrade) plus one (skip 9, tuned 10×50 GHz, Greenfield) lead to only five production variants in total.

The pluggable conversion module 5 further comprises on its receiving signal path a photodiode PD array 5D and a tuneable subchannel WDM filter TWDM 5C for each WDM channel for decoupling the WDM subchannels.

In a possible embodiment, the data transport card 3 as shown in FIG. 2 comprises switching means to bypass the electronic module 7. In a further embodiment, subunits of the electronic module 7 can be bypassed. In a possible embodiment, there is provided a single tuneable optical signal reshaper 5B. In an alternative embodiment, there is provided a tuneable optical signal reshaper 5B for each optical data signal.

FIG. 3 shows a diagram of an active optical fibre 6 which can be used as a component in the WDM data transport system 1 according to the present invention. As can be seen from FIG. 3, the active optical fibre 6 comprises a first pluggable conversion module 5-1 on the transmitting side and a second pluggable conversion module 5-2 on the receiving side. In a possible embodiment, the pluggable conversion modules 5-1, 5-2 are bidirectional and have the structure of a pluggable conversion module 5 as shown in FIG. 2. The active optical fibre 6 as shown in FIG. 3 can be plugged into a data transport card 3-1 on the transmitting side and into a data transport card 3-2 on the receiving side.

FIGS. 4A, 4B show a spectrum for illustrating the functionality of a pluggable conversion module 5 of the present invention as employed in a WDM data transport system 1. The diagrams of FIGS. 4A, 4B show the spectral power density SPD of four WDM subchannels within one WDM channel having a predetermined bandwidth of 100 GHz. In the given example, the four WDM subchannels each have the bandwidth of 25 GHz wherein the center frequencies $f_{ci}$ of the four WDM subchannels are spaced from each other and have a frequency spacing of 25 GHz. FIGS. 4A, 4B show the four center frequencies $f_{c1}$, $f_{c2}$, $f_{c3}$, $f_{c4}$ of the four WDM subchannels within the WDM channel having a bandwidth of 100 GHz. The optical fibre 6 may provide a bandwidth for a plurality of WDM channels each having several WDM subchannels as shown in FIGS. 4A, 4B.

In the example of FIGS. 4A, 4B each WDM subchannel show a ODB shaped power spectrum of an optical duo-binary (ODB) modulation format. The optical duo-binary ODB modulation format provides the advantage that it provides a narrow spectrum and high tolerance to chromatic dispersion. Other modulation formats are possible as well. In an alternative embodiment, the optical data signals comprise an amplitude modulation format or a phase modulation format.

Figure 5A:
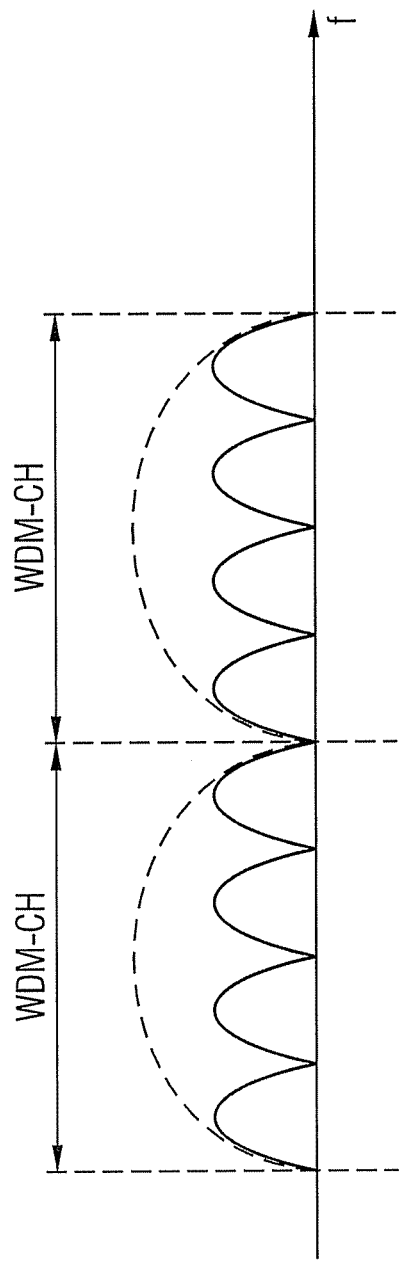
FIGS. 5A, 5B show further spectra for illustrating a possible embodiment of a WDM system according to the present invention.
Figure 5B:
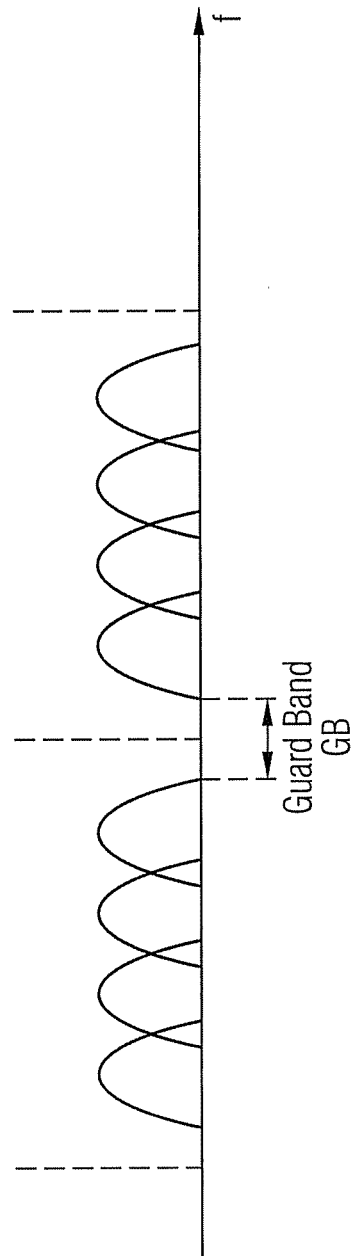

In the upper diagram of FIG. 4A, the WDM subchannels do not overlap. In the example of FIG. 4A, the WDM channel has four WDM subchannels WDMS1, WDMS2, WDMS3 and WDMS4. Since the outer two WDM subchannels WDMS1, WDMS4 suffer from external 100 GHz WDM filters of the system more than the inner WDM subchannels WDMS2, WDMS3 the pluggable conversion module 5 according to the present invention performs a spectrum shaping of the WDM subchannels such that the subchannel spacing is tuned to be less than 25 GHz as illustrated in the lower spectrum as shown in FIG. 4B. In a preferred embodiment of the pluggable module 5 according to the present invention, the WDM subchannel bandwidth of the WDM subchannels WDMSi and the frequency spacing of the subchannel center frequency $f_{ci}$ are adjusted to minimize the bit error rate BER of the transported optical data signals. In a possible embodiment, the subchannel spacing of e.g. 25 GHz is tuned to be less than 25 GHz leading to slightly overlapping data subchannel spectra as indicated in the lower diagram of FIG. 4B. By shifting the center frequencies $f_{c1}$, $f_{c4}$ by a frequency range of ΔF to the middle of the outer WDM subchannels WDMS1 and WDMS4 are less affected by the external 100 GHz WDM filters of the system such reducing the bit error rate BER of the transmitted signal. The trade off is that the WDM subchannels slightly overlap each other leading to an increased bit error rate. Accordingly, the WDM subchannels $WDMS_i$ are adjusted to an optimum where the bit error rates BER of the transported optical data signals is minimal. The tuneable optical signal reshaper TOSR 5B is tuned as shown in FIG. 4 which requires the internal subchannel TWDM filter to be tuned respectively. This can be done by a feedback from the receive end forward error correction unit via an in band or outband ECC. The receive end FEC unit can also provide a feedback signal to the laser array 5A in order to set optimum WDM subchannel power levels P1, P2 as shown in the diagram of FIG. 4B. By tuning the optical signal reshaper OSR, a guard band GB is provided as shown in FIG. 4B which decreases the WDM filter effects. This is illustrated also in FIG. 5 showing the guard band GB between two WDM channels each having four WDM subchannels.

Figure 6:
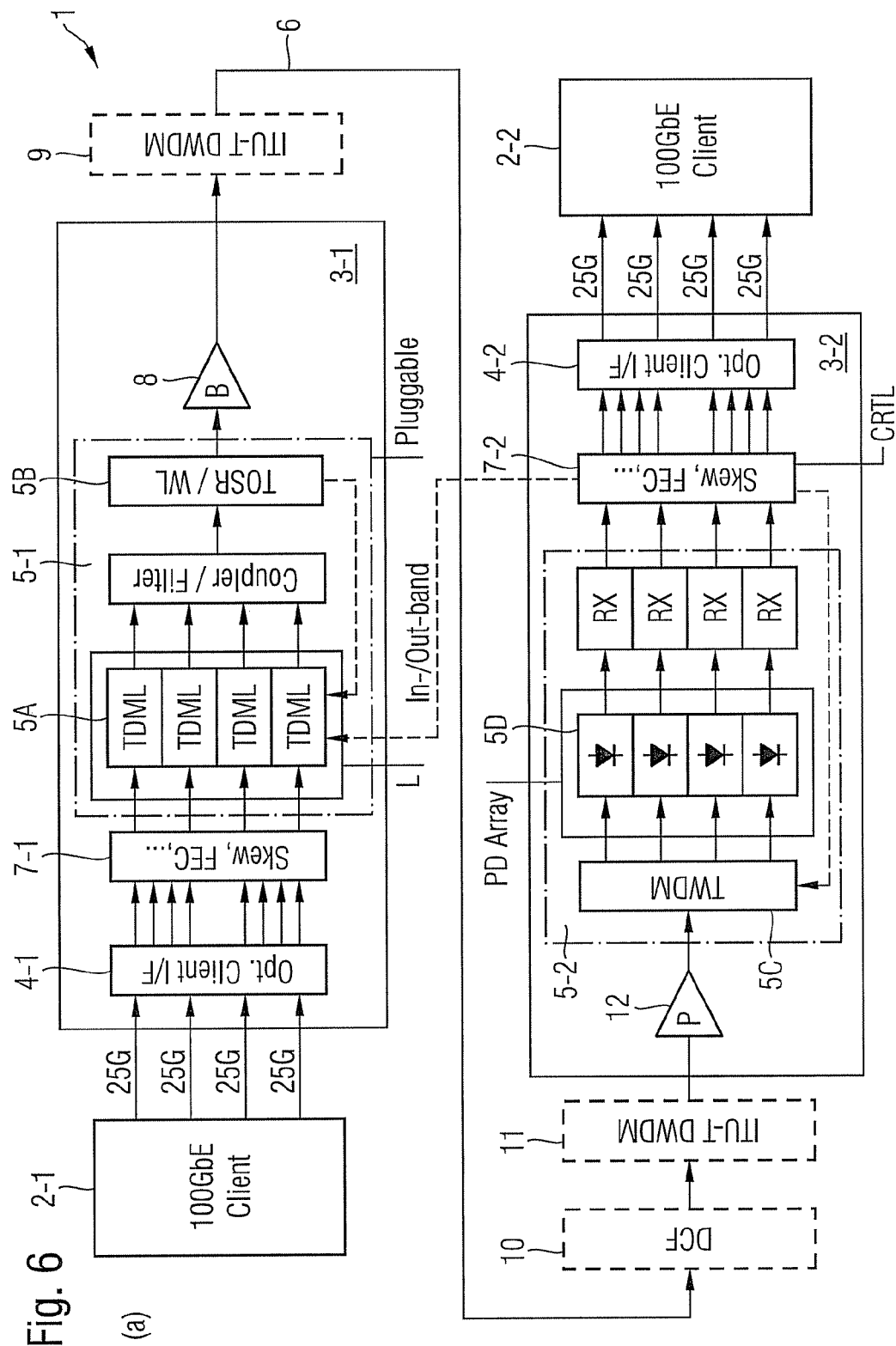
FIG. 6 shows a possible embodiment of a data transport WDM system according to the present invention.

FIG. 6 shows a possible embodiment of the WDM data transport system 1 according to the present invention. In the example of FIG. 6, the WDM transport system 1 comprises one 100 Gbit/s Ethernet client 2 providing four 25 G Ethernet data streams DS to an optical client interface 4 of a data transport card 3 comprising an electronic module 7 performing inter alia deskewing and forward error correction FEC. In the embodiment of FIG. 6, the pluggable conversion module 5 is plugged into a socket of the data transport card 3 and comprises a tuneable directly modulated laser array TDML 5A for each data stream DS. The four 25 G Ethernet signal data streams DS are modulated after forward correction FEC. The DML output is combined by means of a four to one coupler or WDM multiplexer to a WDM channel. Accordingly, the optical data signals generated by the TDML laser array 5A are coupled into at least one wavelength division multiplexing WDM channel for transport of the optical data signals via the optical fibre 6. In the embodiment of FIG. 6, a single tuneable optical signal reshaper TOSR 5B is integrated into the pluggable module 5 and provides a periodic 25 GHz subcarrier grid as shown in the spectrum of FIGS. 4A, 4B. An alignment of a extinction ration or adiabatic chirp is provided in order to provide an ODB modulation at the required bit rates. The output of the tuneable optical signal reshaper 5B can be set to a standard 100 GHz WDM grid after optional booster amplification by means of a booster amplifier 8 as shown in FIG. 6. The optical data signals pass an ITU-DWDM 9 of the WDM system and are transmitted via the optical fibre 6 to a static dispersion compensator DCF 10 and an ITU-T-DWDM 11 at the receiving side. The data transport card 3-2 at the receiving end can comprise a preamplifier 12 for amplitude amplification of the received optical data signals. The data transport card 3-2 further comprises a socket for plugging in a pluggable conversion module 5-2 having in the shown embodiment a TWDM tuneable WDM filter 5C and a photodiode array 5D for converting the decoupled WDM subchannels into data streams DS processed by receivers RX as shown in FIG. 6. As can be seen in FIG. 6, the receive end data transport card 3-2 also comprises an electronic module 7-2 and an optical client interface 4-2 for supplying four 25 GBit/sec data streams to a 100 GBE Ethernet client 2-2. The functions of the electronic module 7 can be adapted by one or several control signals CRTL activating or deactivating different subunits and adjusting parameters of said subunits.

Figure 7:
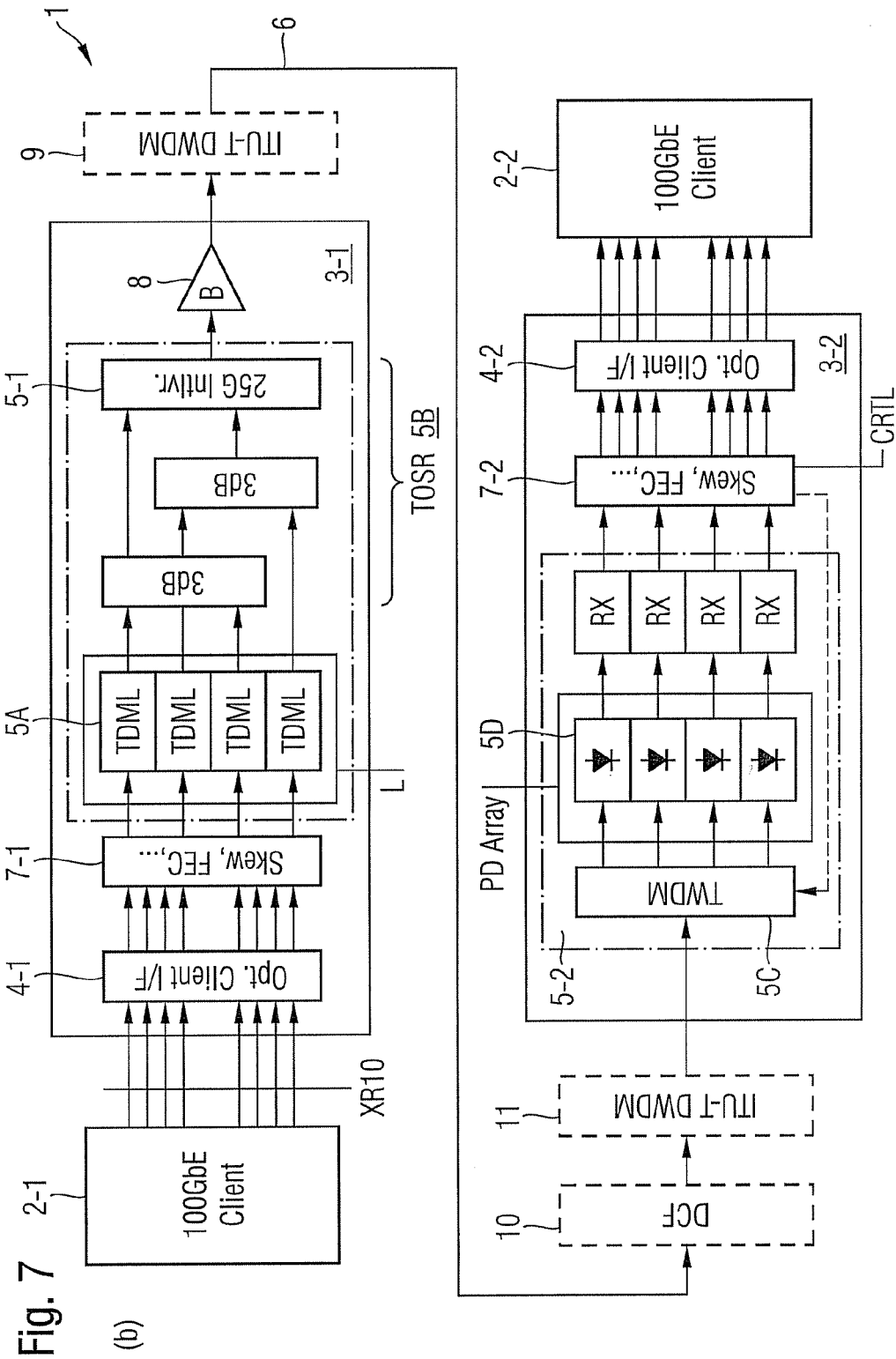
FIG. 7 shows a further possible embodiment of a data transport WDM system according to the present invention.

FIG. 7 shows a further embodiment of a WDM data transport system 1 according to the present invention wherein a 100 GBE client supplies 2-1 100 GbE SR 10 I/F data streams to the interface 4-1 of the data transport card 3-1 on the transmitting side. In the embodiment as shown in FIG. 7, the tuneable optical signal reshaper 5B is formed by two 3 dB power couplers connected on the output side to a 25 G interleaving unit. In an alternative embodiment, the two 3 dB power couplers can be formed by interleaving units as well. The provision of cascaded interleaving units reduces further the bit error rate BER of the transmitted optical data signals.

Figure 8:
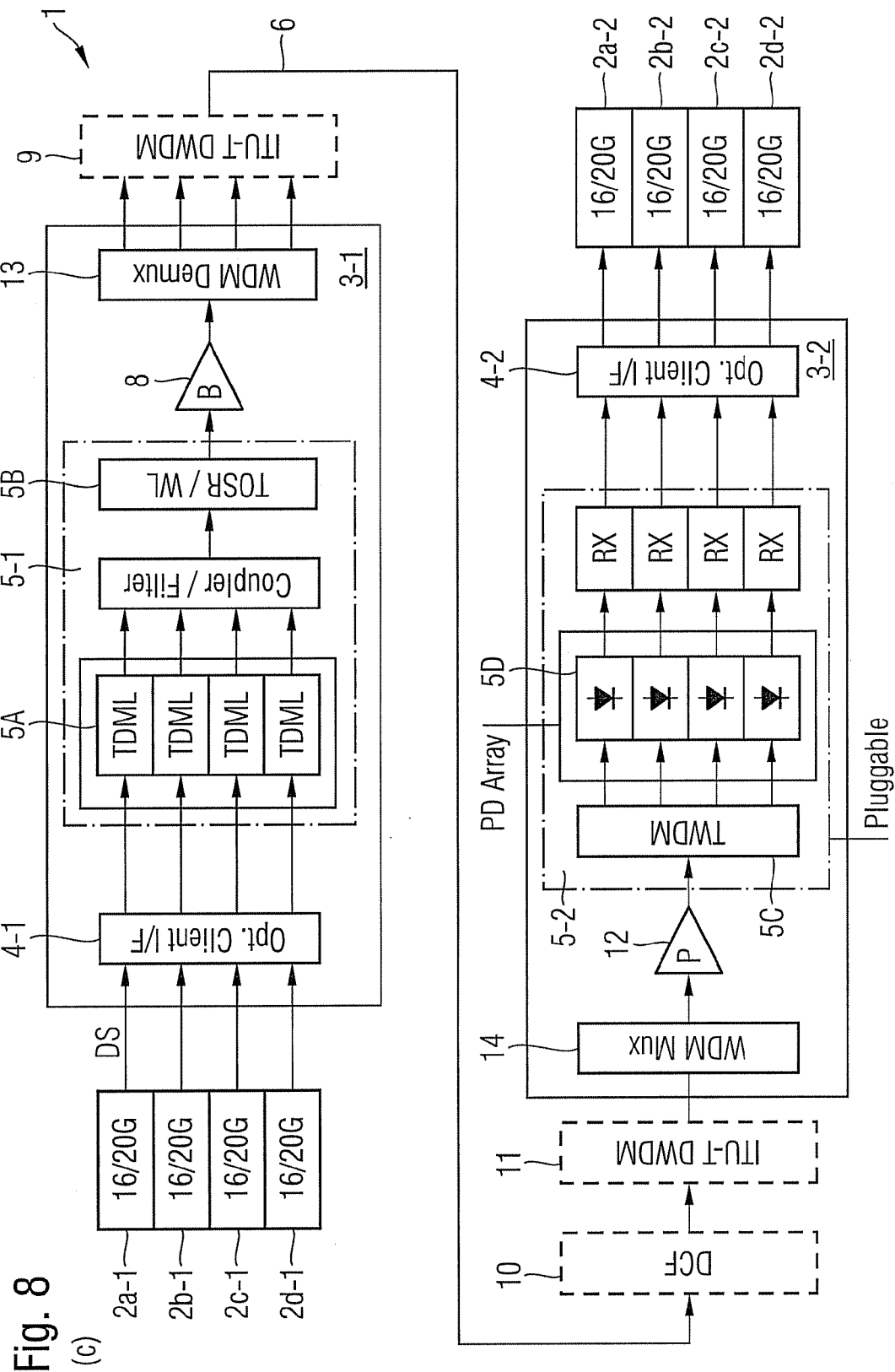
FIG. 8 shows a further possible embodiment of a data transport WDM system according to the present invention.

FIG. 8 shows a further possible embodiment of a WDM data transport system 1 according to the present invention. In this exemplary embodiment, four separate clients 2A-1, 2B-1, 2C-1, 2D-1 are provided on the transmitting side each generating a 16 G or a 20 G data stream DS applied to the data stream interface 4-1 of the data transport card 3-1 on the transmitting side. In the embodiment as shown in FIG. 8, the output signal of the booster amplifier 8 is provided to a WDM demultiplexer 13 provided on the data transport card 3-1. The data transport card 3-2 on the receiving side comprises a corresponding WDM multiplexer 14. The output data streams are supplied to four separate clients 2A-2 to 2D-4.

Figure 9:
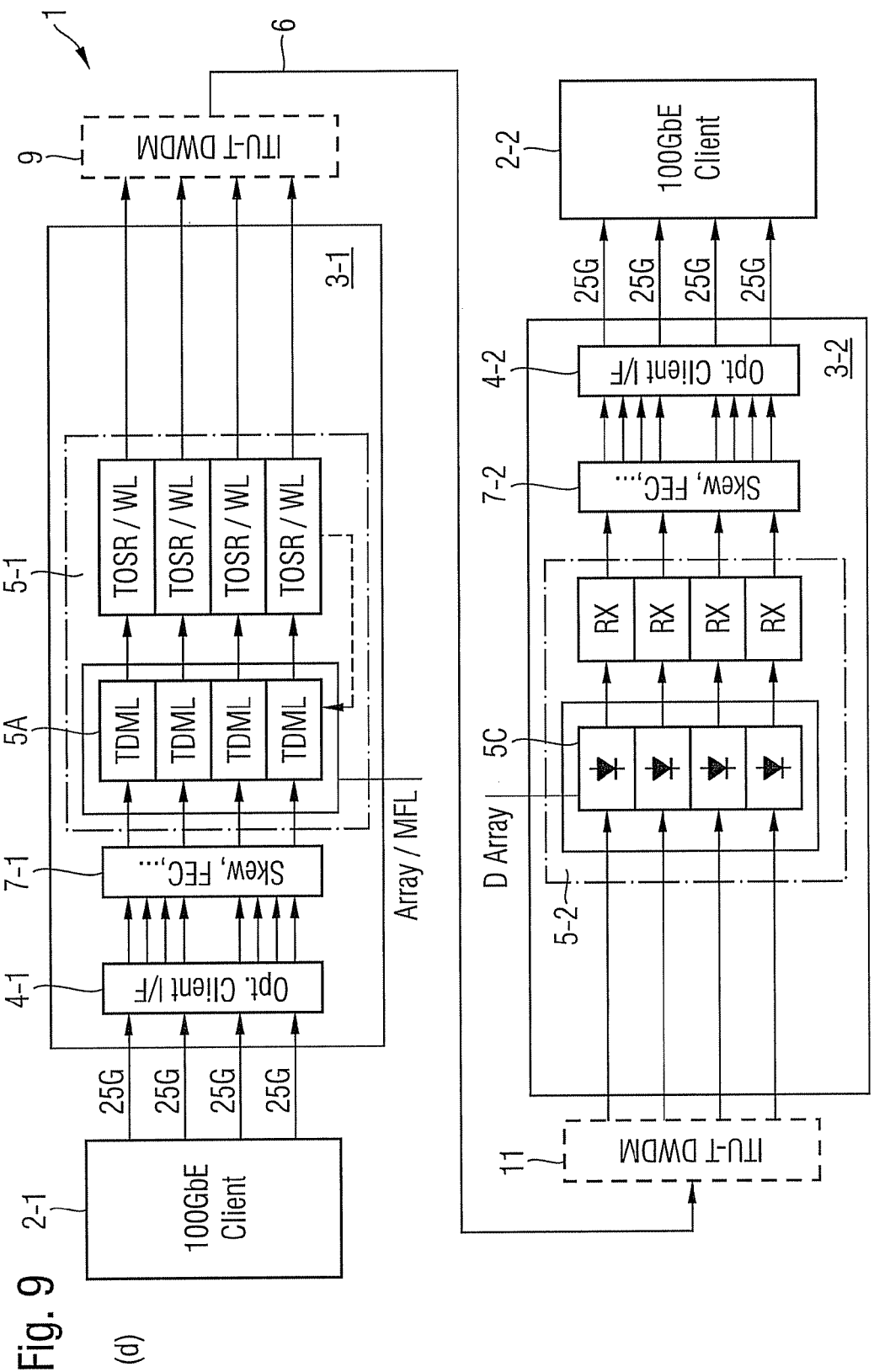
FIG. 9 shows a further embodiment of a data transport WDM system according to the present invention.

FIG. 9 shows a further embodiment of a WDM data transport system 1 according to the present invention having a data transport card 3-1 on the transmitting side for receiving a pluggable conversion module 5-1 having four tuneable optical signal reshapers TOSR and wavelength lockers WL for each data stream DS. The wavelength lockers WL as shown in the different embodiments are provided for locking the WDM subchannel frequencies.

Figure 10:
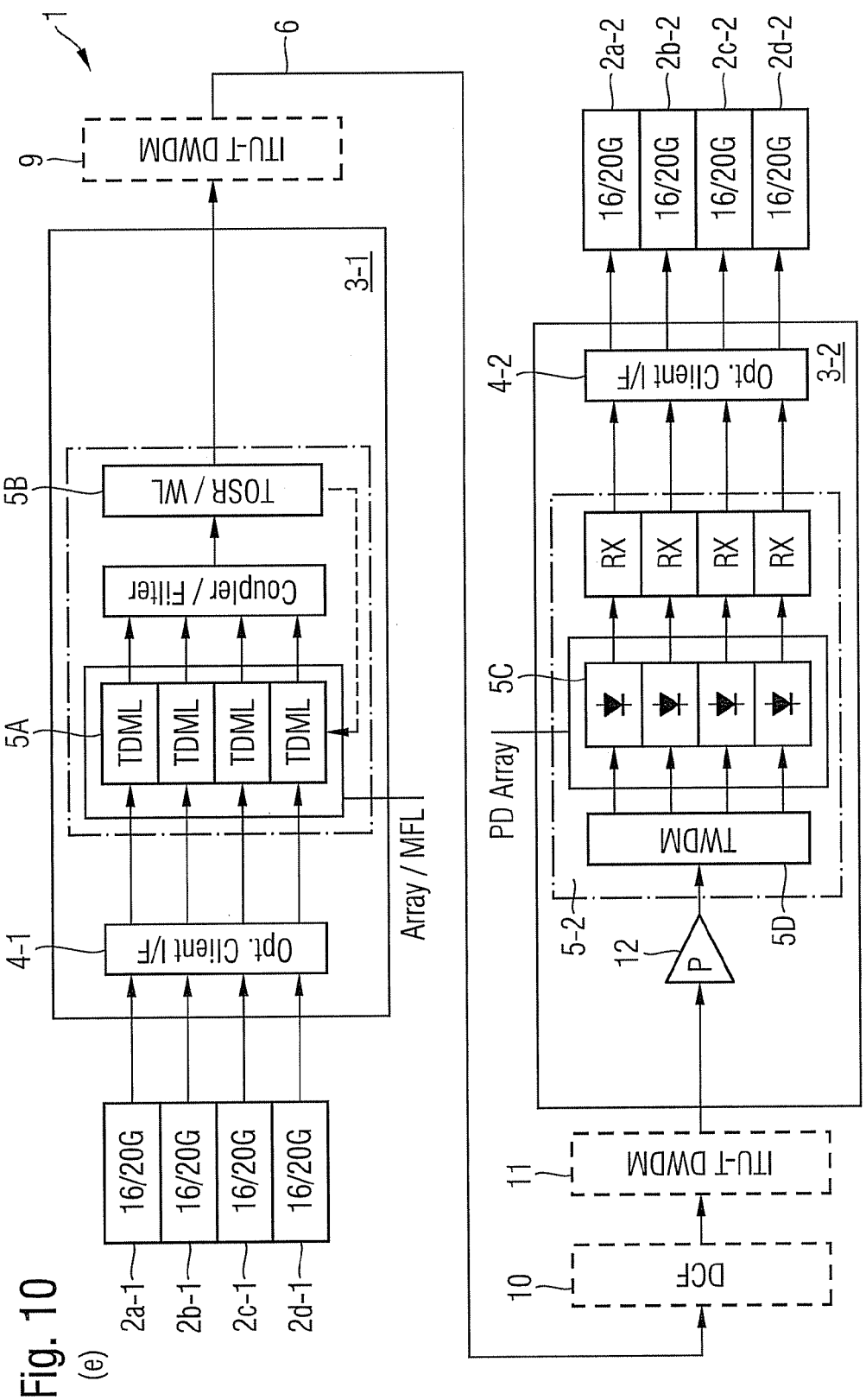
FIG. 10 shows a further possible embodiment of a data transport WDM system according to the present invention.

FIG. 10 shows a further exemplary embodiment of a WDM data transport system 1 according to the present invention having four separate clients 2A-1, 2B-1, 2C-1, 2D-1 on the transmitting and receiving side 2A-2, 2B-2, 2C-2, 2D-2 each generating or receiving a 16 G or 20 G data stream. Furthermore, the pluggable module 5-1 on the transmitting side comprises a single tuneable optical signal reshaper TOSR 5B. In a possible embodiment, the TWDM 5D of the pluggable module 5-2 on the receiving side can be thermically tuned.

Figure 11:
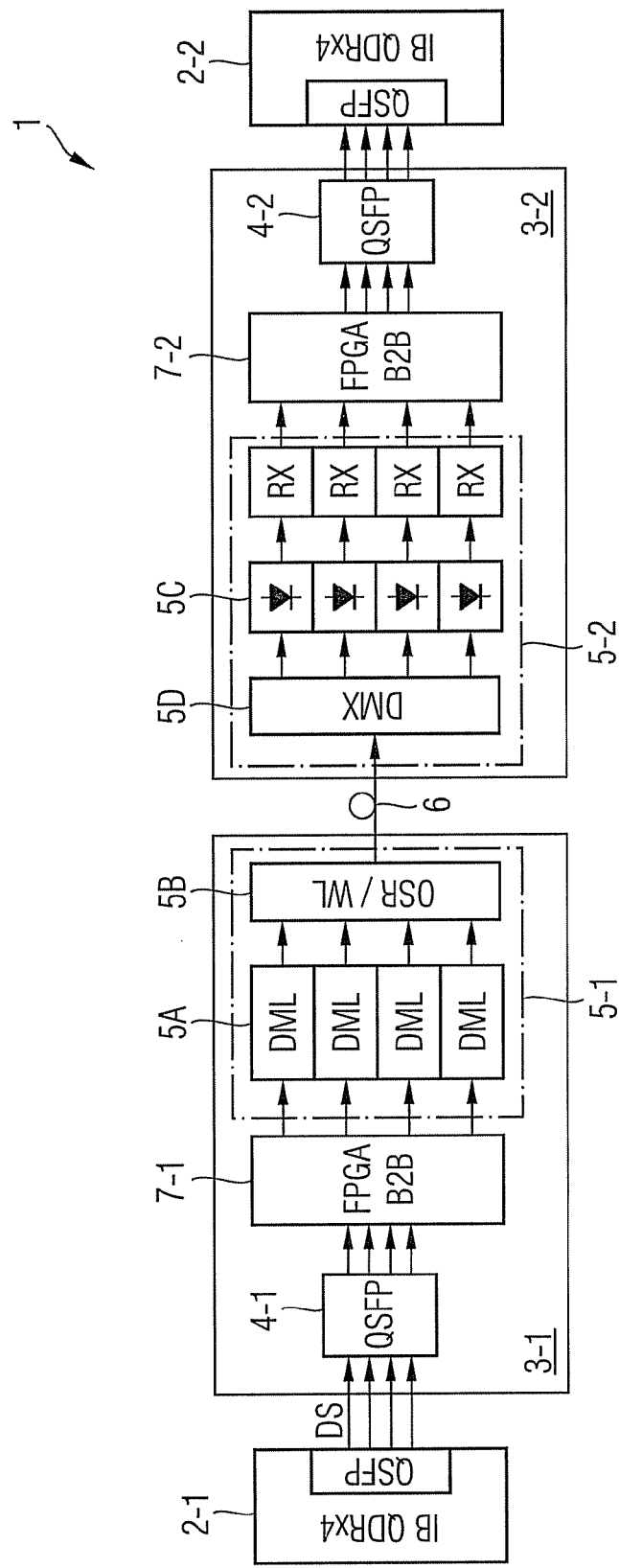
FIG. 11 shows a further possible embodiment of a data transport WDM system according to the present invention.

FIG. 11 shows a further exemplary embodiment of a WDM data transport system 1 according to the present invention. The has embodiment shows a client having a QSFP (Quadruple Signal Form Factor Pluggable) providing 40 GBs Infiniband data stream to a QSFP interface 4-1 of a data transport card 3-1. The electronic module 7-1 is formed by an FPGA unit as shown in FIG. 11. The arrangement as shown in FIG. 11 can support IBQDR×4 or 4×10 G or 40 GBE data streams. The arrangement can be extended to QDR×12 data streams.

FIG. 12 shows a flowchart of a possible embodiment of a method for transporting data via an optical fibre 6.

In a first step S1, high speed data streams DS are received via an interface 4 from at least one or several clients 2.

In a further step S2, the received data streams DS are converted into optical data signals and coupled into at least one wavelength division multiplexing channel WDM having several WDM subchannels WDMS for transporting said optical data signals via the optical fibre 6.

In a further step S3, the optical data signals received via the optical fibre 6 in different wavelength division multiplexing subchannels WDMS of at least one wavelength division multiplexing channel WDMS which has for example a predetermined bandwidth of 100 GHz, are decoupled to data streams for at least one receiving client 2.

In a further step S4, the decoupled data streams are supplied to the clients 2 on the receiving side.

In a possible embodiment, the method for data transport as shown in the flowchart of FIG. 12 is performed on the basis of a hardware platform in real time.

In an alternative embodiment, the method is performed by a computer program comprising a instructions for performing the method as shown in FIG. 12.

In a possible embodiment, this computer program is loaded from a data carrier storing said computer program.

In a possible embodiment, the WDM data transport system 1 according to the present invention as shown in the different embodiments is configurable depending on the length of the optical fibre 6, in particular, the laser array 5A and the tuneable optical signal reshaper TOSR 5B can be configured to meet the different requirements of different network environments.

Figure 13A:
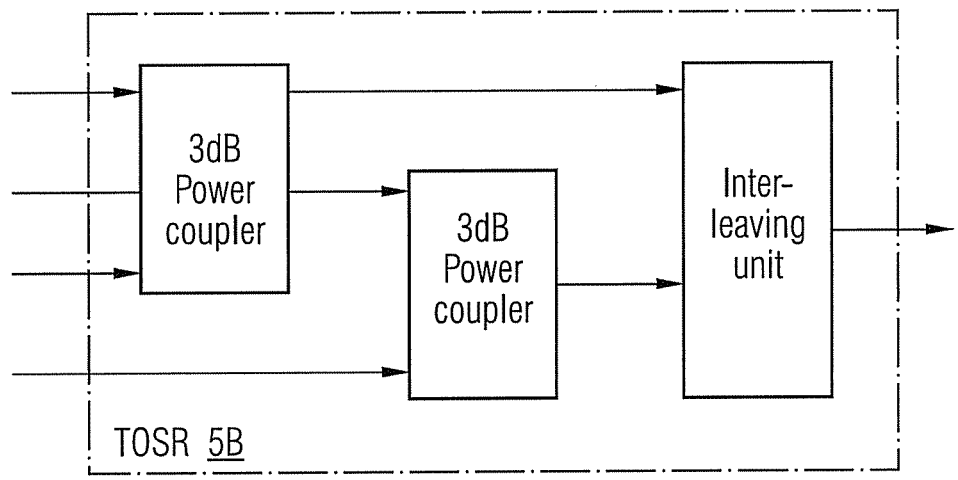
FIGS. 13A, 13B show embodiments of a tuneable optical signal reshaper being implemented in a pluggable conversion module according to the present invention.
Figure 13B:
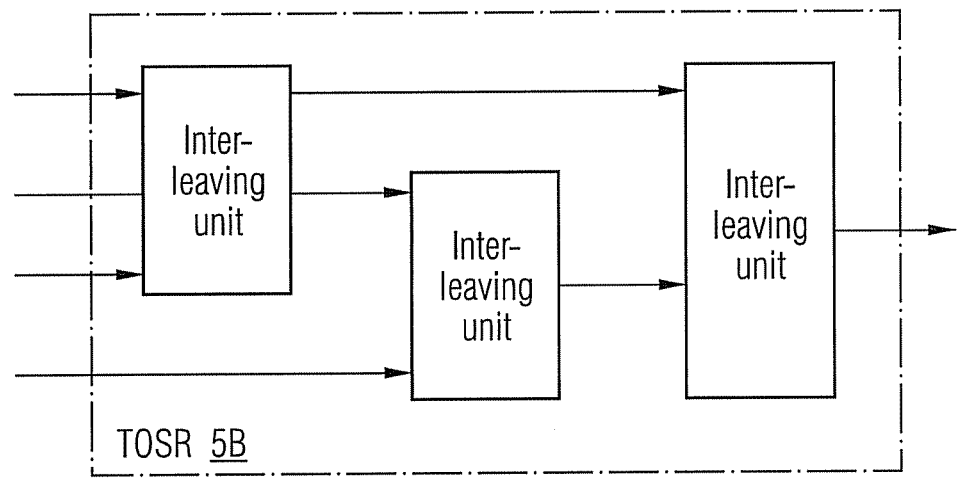

FIGS. 13A, 13B show two embodiments for implementing a tuneable optical signal reshaper 5B as employed by the WDM data transport system 1 according to the present invention.

In a possible embodiment, the tuneable optical signal reshaper 5B as shown in FIGS. 13A, 13B is formed by a separate device or by a separate pluggable module which can be plugged into the motherboard of the data transport card 3-1.

In a possible embodiment, the invention provides a flexible 100 GBE data transport system for one or multiple high speed data signals over an optical fibre 6.

The WDM data transport system 1 according to the present invention provides different configurations supporting different environments and requirements with a relatively low complexity. The WDM data transport system 1 according to the present invention can be used for a wide range of different data stream formats such as Ethernet Fibre Channel or InfiniBand. Furthermore, it can be used for different kinds of optical signal modulation formats. By activating or deactivating subunits of the electronic module 7, it is possible to provide low latency variants.

In a possible embodiment, the laser array 5A is tuneable whereas in other embodiments the laser array 5A is not tuneable. If the laser array 5-1 is tuneable, it is in a preferred embodiment tuned in response to a feedback control signal sent back from the receiving side via an embedded communication channel ECC. In a possible embodiment, another data transport channel is used for sending the feedback control signal to the tuneable laser array 5A.

What is claimed is:

1. A data transport card comprising:
   an interface to receive high speed data streams from at least one client; and an opto-electronic module which converts said data streams into optical data signals and couples these optical data signals into at least one wavelength division multiplexing channel for transport of said optical data signals via an optical fibre,
   wherein said wavelength division multiplexing channel has a predetermined bandwidth and comprises a number of WDM subchannels corresponding to a number of received data streams; and wherein the opto-electronic module is configured for optimizing the bandwidth and spacing of the subchannels; and an electronic module, said electronic module comprising:
a mapping and framing unit for mapping the data streams into ODU-data frames,
a monitoring unit for monitoring data integrity,
a FEC unit for performing a forward error correction of said ODU-data frames, and
a deskewing unit for performing a deskewing of said data streams.

2. The data transport card according to claim 1, wherein said wavelength division multiplexing channel is a 100 GHz WDM channel comprising four 25 GHz WDM subchannels or two 50 GHz WDM subchannels.

3. The data transport card according to claim 2, wherein said opto-electronic module comprises a laser array for converting said data streams into said optical data signals.

4. The data transport card according to claim 3, wherein said laser array is a directly modulated laser array or an externally modulated laser array.

5. The data transport card according to claim 4, wherein said laser array is tuneable by a feedback control signal from a receive end data transport card.

6. The data transport card according to claim 5, wherein an inband or outband embedded communication channel is provided for said feedback control signal sent by said receive end transport card back to said data transport card via said optical fibre.

7. The data transport card according to claim 6, wherein said WDM subchannel power levels and the WDM subchannel center-frequencies are set by said tuneable laser array in response to said feedback control signal to minimize a bit error rate of said transported optical data signals.

8. The data transport card according to claim 1, wherein said opto-electronic module comprises a tuneable optical signal reshaper being adaptable to the bandwidth and to the spacing of at least one of said number of WDM subchannels to optimize WDM subchannel power levels and to minimize crosstalk.

9. The data transport card according to claim 8, wherein said tuneable optical signal reshaper is provided for spectrum-shaping of said WDM subchannels, wherein WDM subchannel bandwidths and the spacing of the subchannel center frequencies are adjusted to minimize the bit error rate of said optical data signals.

10. The data transport card according to claim 9, wherein said tuneable optical signal reshaper is tuneable in response to the feedback control signal from the receive end data transport card sent via said inband or outband communication channel.

11. The data transport card according to claim 1, wherein said opto-electronic module comprises a wavelength locker which locks the WDM subchannel frequencies.

12. The data transport card according to claim 1, wherein said opto-electronic module is tuneable over an adjustable number of WDM subchannels.

13. The data transport card according to claim 1, wherein said optical data signals comprise an optical duo-binary modulation format, an amplitude modulation format or a phase modulation format.

14. The data transport card according to claim 1, wherein said data streams provided by said at least one client comprise high speed Ethernet data streams, high speed Fibre Channel data streams and high speed InfiniBand data streams, each having a bitrate of more than 4 Gbit/sec.

15. The data transport card according to claim 1, wherein said electronic module is a FPGA-unit.

16. The data transport card according to claim 1 wherein said data transport card is a receive end data transport card comprising:
the opto-electronic module which converts optical data signals received via an optical fibre in different wavelength division multiplexing subchannels of at least one wavelength division multiplexing channel having a predetermined bandwidth into data streams for the at least one client.

17. The data transport card according to claim 16, wherein said opto-electronic module comprises:
a tuneable subchannel WDM filter for each WDM channel for decoupling said WDM subchannels and
a photodiode array for converting the decoupled WDM subchannels into said data streams.

18. The data transport card according to claim 1 wherein the data transport card is a bidirectional data transport card comprising:
a data stream interface to input data streams from the at least one client and to output data streams to the at least one client; and
the opto-electronic module having means for converting said input data streams into optical data signals for coupling these optical data signals into WDM subchannels of at least one wavelength division multiplexing channel for transport of said optical data signals via the optical fibre and means for converting optical data signals received via said optical fibre in different wavelength multiplexing subchannels of at least one wavelength division multiplexing channel into said output data streams.

19. The data transport card according to claim 1 wherein said opto-electronic module is a pluggable conversion module.

20. A method for transporting data comprising the steps of:
receiving data streams from at least one client;
converting said data streams into optical data signals and coupling these optical data signals into wavelength division multiplexing subchannels of at least one wavelength division multiplexing channel for transport of said optical data signals via an optical fibre;
optimizing the bandwidth and spacing of the subchannels;
reconverting the optical data signals received via said optical fibre in the different wavelength division multiplexing subchannels of said at least one wavelength division multiplexing channel into data streams;
supplying said reconverted data streams to at least one client;
mapping the data streams into ODU-data frames;
monitoring data integrity;
performing a forward error correction of said ODU-data frames, and
performing a deskewing of said data streams.

21. The method according to claim 20, wherein the WDM-subchannel spacing is adapted.

* * * * *